US007292872B2

(12) United States Patent
Pantalone et al.

(10) Patent No.: US 7,292,872 B2
(45) Date of Patent: Nov. 6, 2007

(54) MOBILE PHONE PUSH-TO-TALK VOICE ACTIVATION

(75) Inventors: Brett Pantalone, Willow Court, NC (US); Walter Marion Marcinkiewicz, Apex, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 532 days.

(21) Appl. No.: 10/710,584

(22) Filed: Jul. 22, 2004

(65) Prior Publication Data
US 2006/0019689 A1    Jan. 26, 2006

(51) Int. Cl.
*H04B 7/00* (2006.01)
(52) U.S. Cl. .................. 455/519; 455/517; 455/518
(58) Field of Classification Search ............. 455/414.1, 455/418, 517–521
See application file for complete search history.

(56) References Cited

U.S. PATENT DOCUMENTS

| 5,583,919 | A | 12/1996 | Talvard et al. | |
| 6,263,216 | B1 | 7/2001 | Seydoux et al. | |
| 6,763,226 | B1 | 7/2004 | McZeal | |
| 2003/0144034 | A1* | 7/2003 | Hack et al. | 455/566 |
| 2004/0266468 | A1* | 12/2004 | Brown et al. | 455/518 |

OTHER PUBLICATIONS

Sony Ericsson Mobile Communications AB, "International Application No. PCT/US05/002656" *International Search Report*, Jun. 28, 2005.
Sony Ericsson Mobile Communications AB, "International Application No. PCT/US05/002656" *Written Opinion*, Jun. 28, 2005.
Sony Ericsson Mobile Communications AB, International Patent Application No. PCT/US2005/002656, "International Preliminary Report on Patentability", Oct. 31, 2006.

* cited by examiner

*Primary Examiner*—Edward F. Urban
*Assistant Examiner*—Raymond S. Dean
(74) *Attorney, Agent, or Firm*—Moore & Van Allen, PLLC

(57) ABSTRACT

A voice activated method of establishing a Push-to-Talk (PTT) connection from a mobile phone is disclosed. The mobile phone user presses and holds a PTT key on the mobile phone. The user then speaks the name of a contact. The mobile phone recognizes the name of a contact that has been spoken and associates the recognized name with an entry in the mobile phone's memory. The mobile phone then displays the name of the contact on its display. The user can then speak additional contact names or can release the PTT key. Upon release of the PTT key, the mobile phone initiates a PTT connection from the mobile phone to the contact(s) displayed. The mobile phone uses PTT contact data in the mobile phone's memory associated with the contact name to make the PTT connection. The name of a contact may also comprise a group name that is associated with multiple contacts.

20 Claims, 3 Drawing Sheets

MOBILE PHONE PUSH-TO-TALK VOICE ACTIVATION

BACKGROUND OF INVENTION

Mobile phone users increasingly rely on their mobile phones for their communication and organizational needs. More recently, Push-to-Talk (PTT) technology over a cellular network, a Voice-Over IP (VoIP) network such as Session Initiated Protocol (SIP), or a Wireless Local Area Network (WLAN) has provided even more options for personal communications among groups of users. PTT provides users with instantaneous connections that bypass some of the more rigorous call establishment procedures associated with traditional mobile phone calls. It is the convenience of instantaneous two-way connection that gives PTT its appeal. While the infrastructure, systems, and hardware used to establish these connections works quite well, the steps incumbent upon the mobile phone user to activate PTT can seem complex or complicated, is especially true if a PTT session is to involve multiple parties. This front-end PTT initiation complexity effectively lessens the benefits of instantaneous connections that can be achieved with PTT.

What is needed is a procedure that reduces the front-end complexity associated with PTT initiation, especially if a PTT session is to involve multiple parties.

SUMMARY OF INVENTION

A voice activated method of establishing a Push-to-Talk (PTT) connection from a mobile phone is disclosed. The term mobile phone used throughout this disclosure refers to a telephone handset that can operate on a cellular network, a Voice-Over IP (VoIP) network such as Session Initiated Protocol (SIP), or a Wireless Local Area Network (WLAN) using an 802.11x protocol, or any combination thereof. The mobile phone user presses and holds a PTT key on the mobile phone. The user then speaks the name of a contact. The mobile phone recognizes the name of a contact that has been spoken and associates the recognized name with an entry in the mobile phone's memory. The mobile phone then displays the name of the contact on its display. The user can then speak additional contact names or can release the PTT key. Upon release of the PTT key, the mobile phone initiates a PTT connection from the mobile phone to the contact(s) displayed. The mobile phone uses PTT contact data in the mobile phone's memory associated with the contact name to make the PTT connection. The name of a contact may also comprise a group name that is associated with multiple contacts.

The method may also be implemented by software as a computer program product or as a system within the mobile phone.

DETAILED DESCRIPTION

Figure 1:
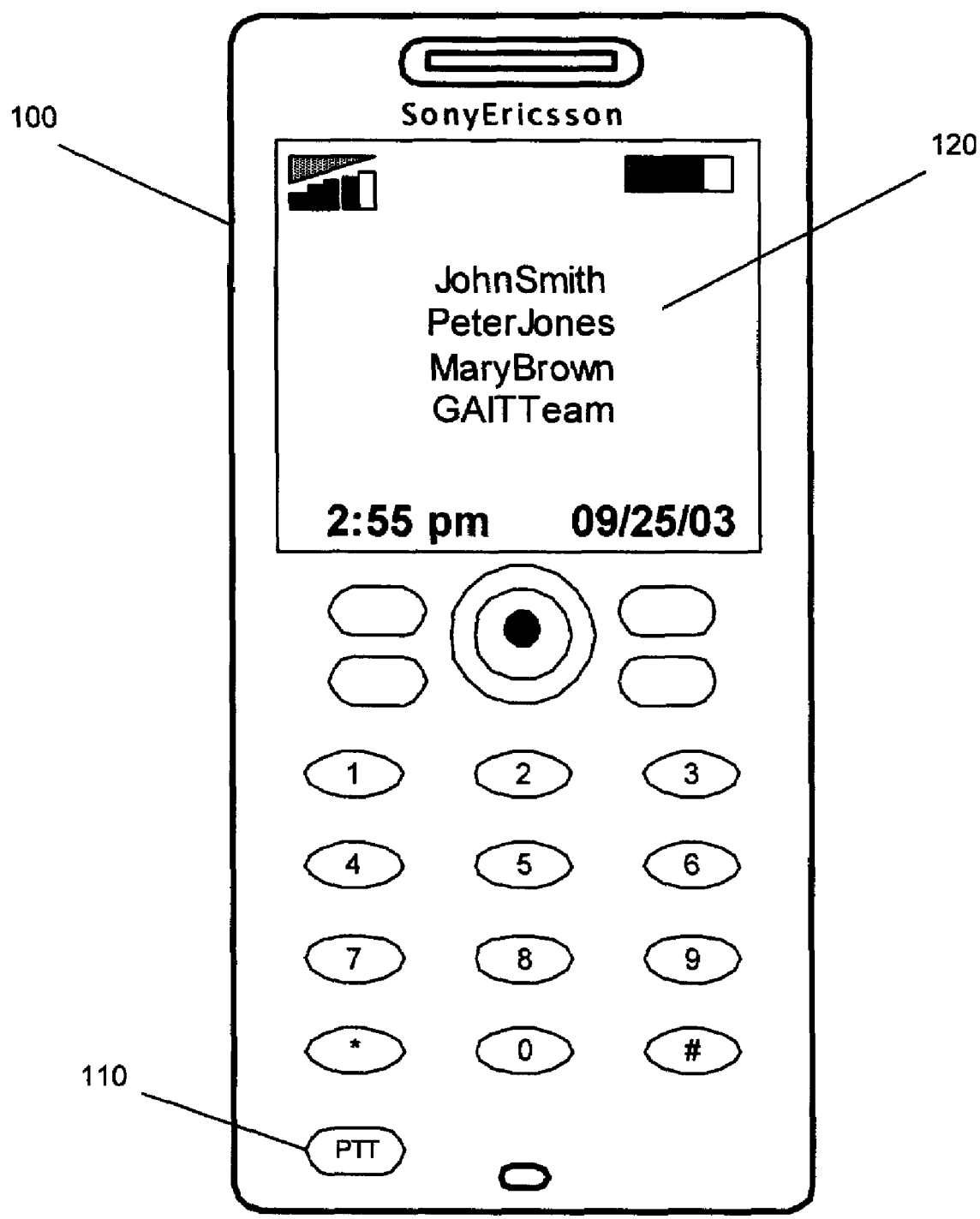
FIG. 1 illustrates a typical mobile phone showing a Push-to-Talk button and sample display of contact names.

FIG. 1 illustrates a typical mobile phone 100. Mobile phone 100 is shown having a display along with a keypad for entering data into the mobile phone. One of the keys shown is a PTT key 110. The PTT key, when depressed, places mobile phone 100 in a Push-to-Talk mode as opposed to the regular full duplex call establishment mode for the cellular, SIP, or WLAN network. PTT key 110 has been illustrated here as a hard-wired key in the lower left corner of the front face of the mobile phone. This is illustrative only. One of ordinary skill in the art could easily choose to implement the PTT key in an alternate location or as a "soft key".

FIG. 1 also illustrates several names on the display 120. These names represent contacts or groups that the mobile phone user wishes to establish a PTT connection with as per the steps to be described with respect to FIGS. 2 and 3.

Figure 2:
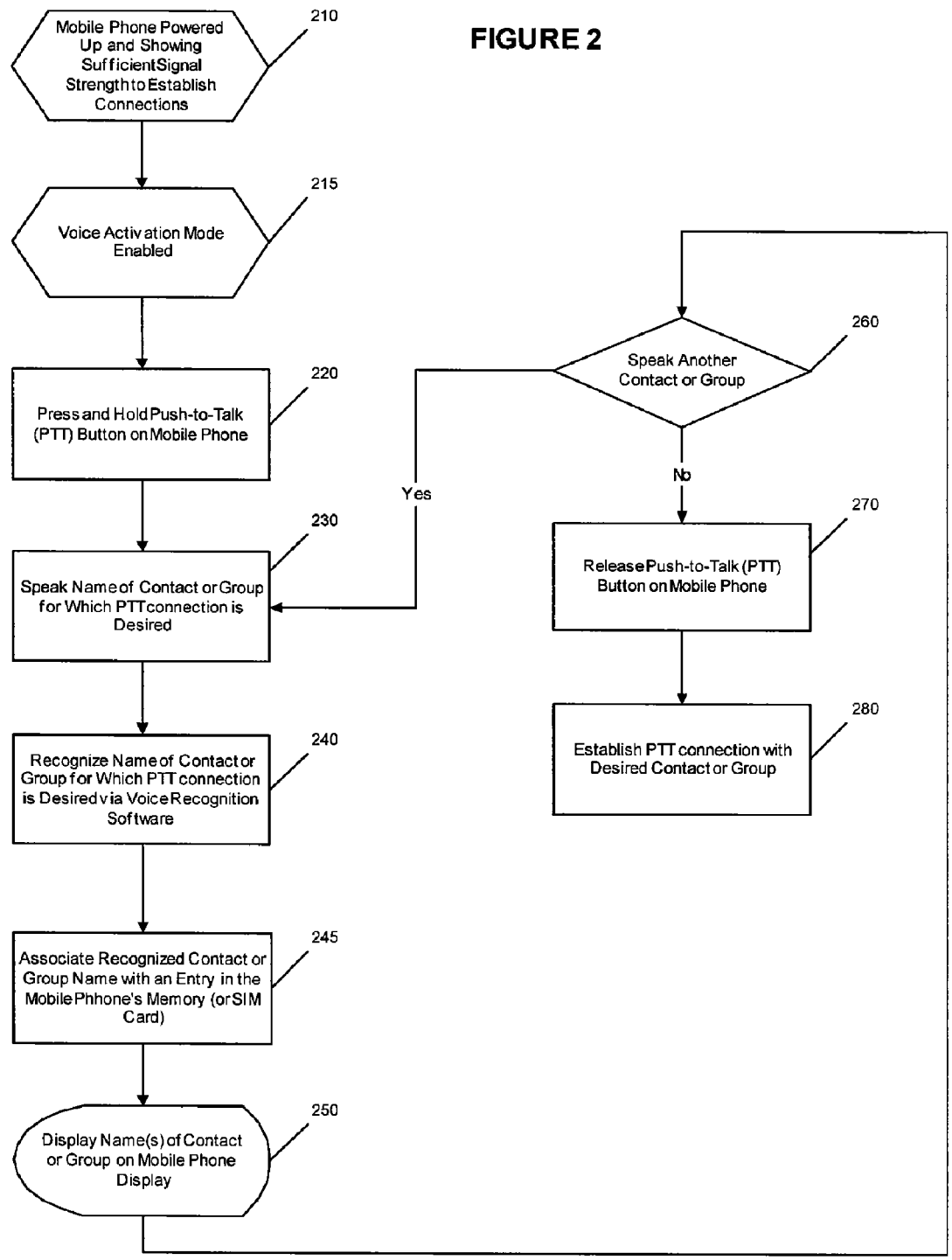
FIG. 2 illustrates a flowchart describing one embodiment of the present invention.

FIG. 2 is a flowchart illustrating a first embodiment of the present invention. There are two pre-conditions that should be met before the present invention can function effectively. The first pre-condition is that the mobile phone be powered on and have sufficient signal strength so that the establishment of a call with the network can be achieved 210. The second pre-condition is that voice activation mode is active 215. Voice activation mode refers to the mobile phone's ability to receive and recognize verbal instructions from the mobile phone user. While these two steps have been characterized as pre-conditions, they do not affect the scope of the present invention. The steps that comprise the present invention assume these conditions to be met but do not actively cause these conditions to be met.

In a first implementation, when the mobile phone user wishes to make a PTT connection, he presses and holds the PTT key 220. While holding the PTT key, he speaks the name of a contact or the name of a group that he wishes to establish a PTT connection 230. The mobile phone uses voice recognition processing to recognize the name of the contact or group 240. Upon recognition, the mobile phone will attempt to associate the recognized contact or group name with an entry in the mobile phone's memory (or SIM card) 245. The mobile phone will then display the contact name or group as it is listed in the mobile phone's memory (or SIM card) 250. The user will then decide whether to speak an additional contact name or group 260. If he does decide to add more contacts to the PTT connection, the mobile phone will repeat steps 240 and 250 until the user is finished. The user signals that he is finished by releasing the PTT key 270. This causes the mobile phone to initiate the establishment of a PTT connection 280 with everyone identified on the mobile phone's display.

Figure 3:
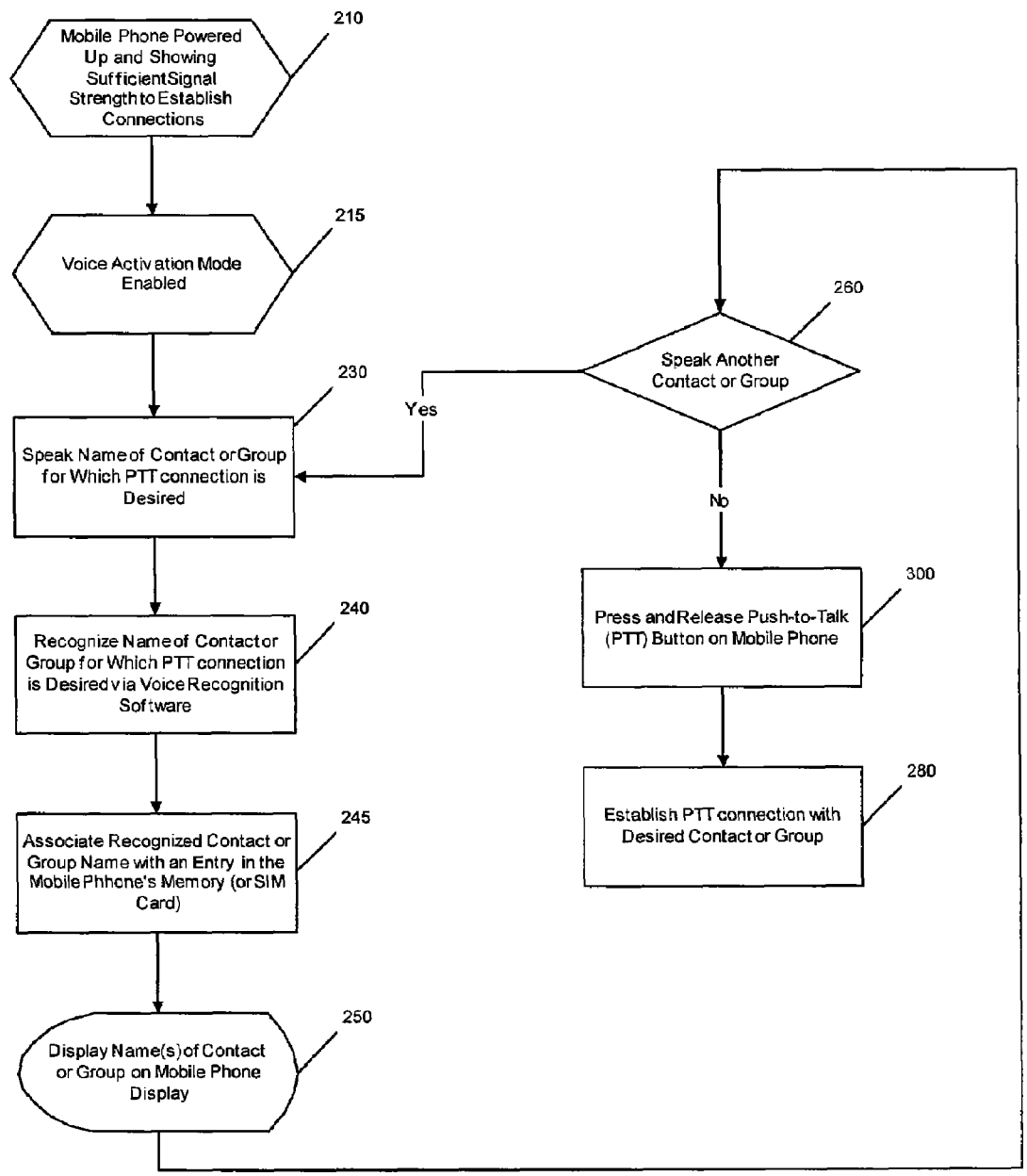
FIG. 3 illustrates a flowchart describing another embodiment of the present invention.

In an alternative implementation described by FIG. 3, the mobile phone user creates the list of contacts or groups he wishes to establish a PTT connection with prior to pressing the PTT key. Once again it is assumed that the preconditions described in blocks 210 and 215 are met. This time the user speaks the contact or group name first 230. The mobile phone recognizes 240 and associates the recognized contact or group name with an entry in the mobile phone's memory (or SIM card) 245. The mobile phone then displays 250 the names on the mobile phone's display. The user can continue to speak names 260 until all the contacts or groups for the PT connection have been displayed. At this point the user presses and releases the PTT key 300 to indicate to the mobile phone to initiate establishment of a PTT connection with the displayed contacts and groups 280.

Computer program elements of the invention may be embodied in hardware and/or in software (including firmware, resident software, micro-code, etc.). The invention may take the form of a computer program product, which can be embodied by a computer-usable or computer-readable storage medium having computer-usable or computer-readable program instructions, "code" or a "computer program" embodied in the medium for use by or in connection with the instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium such as the Internet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner. The computer program product and any software and hardware described herein form the various means for carrying out the functions of the invention in the example embodiments.

Specific embodiments of an invention are disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means".

The invention claimed is:

1. A voice activated method of establishing a Push-to-Talk (PTT) connection from a mobile phone comprising:
    pressing and holding a PTT key on the mobile phone;
    recognizing the name of a contact that has been spoken;
    associating the recognized name of the contact that has been spoken with an entry in the mobile phone's memory;
    displaying the name of the contact on the mobile phone's display;
    releasing the PTT key on the mobile phone; and
    initiating a PTT connection upon release of the PTT key, wherein the PTT connection is from the mobile phone to the contact displayed on the mobile phone's display and uses PTT contact data in the mobile phone's memory associated with the contact name to make the PTT connection.

2. The method of claim 1 wherein the mobile phone operates on a cellular network.

3. The method of claim 1 wherein the mobile phone operates on a Voice-Over IP (VoIP) network.

4. The method of claim 1 wherein the mobile phone operates on a Wireless Local Area Network (WLAN).

5. The method of claim 1 wherein the name of a contact can comprise a group name that is associated with multiple contacts.

6. A voice activated method of establishing a Push-to-Talk (PTT) connection from a mobile phone comprising:
    recognizing the name of a contact that has been spoken;
    associating the recognized name of the contact that has been spoken with an entry in the mobile phone's memory;
    displaying the name of the contact on the mobile phone's display;
    pressing and releasing the PTT key on the mobile phone; and
    initiating a PTT connection upon release of the PTT key, wherein the PTT connection is from the mobile phone to the contact displayed on the mobile phone's display and uses PTT contact data in the mobile phone's memory associated with the contact name to make the PTT connection.

7. The method of claim 6 wherein the mobile phone operates on a cellular network.

8. The method of claim 6 wherein the mobile phone operates on a Voice-Over IP (VoIP) network.

9. The method of claim 6 wherein the mobile phone operates on a Wireless Local Area Network (WLAN).

10. The method of claim 3 wherein the name of a contact can comprise a group name that is associated with multiple contacts.

11. A computer readable medium storing a computer program product for establishing a voice activated Push-to-Talk (PTT) connection from a mobile phone, the computer readable medium comprising:
    computer program code for recognizing when a PTT key on the mobile phone has been pressed;
    computer program code for recognizing the name of a contact that has been spoken;
    computer program code for associating the recognized name of the contact that has been spoken with an entry in the mobile phone's memory;
    computer program code for displaying the name of the contact on the mobile phone's display;
    computer program code for recognizing when a PTT key on the mobile phone has been released; and
    computer program code for initiating a PTT connection upon release of the PTT key, wherein the PTT connection is from the mobile phone to the contact displayed on the mobile phone's display and uses PTT contact data in the mobile phone's memory associated with the contact name to make the PTT connection.

12. The computer readable medium of claim 11 wherein the mobile phone operates on a cellular network.

13. The computer readable medium of claim 11 wherein the mobile phone operates on a Voice-Over IP (VoIP) network.

14. The computer readable medium of claim 11 wherein the mobile phone operates on a Wireless Local Area Network (WLAN).

15. The computer readable medium of claim 11 wherein the name of a contact can comprise a group name that is associated with multiple contacts.

16. A computer readable medium storing a computer program product for establishing a voice activated Push-to-Talk (PTT) connection from a mobile phone, the computer readable medium comprising:
    computer program code for recognizing the name of a contact that has been spoken;
    computer program code for associating the recognized name of the contact that has been spoken with an entry in the mobile phone's memory;
    computer program code for displaying the name of the contact on the mobile phone's display;
    computer program code for recognizing when a PTT key on the mobile phone has been pressed and released; and
    computer program code for initiating a PTT connection upon release of the PTT key, wherein the PTT connection is from the mobile phone to the contact displayed on the mobile phone's display and uses PTT contact data in the mobile phone's memory associated with the contact name to make the PTT connection.

17. The computer readable medium of claim 16 wherein the mobile phone operates on a cellular network.

18. The computer readable medium of claim 16 wherein the mobile phone operates on a Voice-Over IP (VoIP) network.

19. The computer readable medium of claim 16 wherein the mobile phone operates on a Wireless Local Area Network (WLAN).

20. The computer readable medium of claim 16 wherein the name of a contact can comprise a group name that is associated with multiple contacts.

* * * * *